(No Model.)

L. C. KECK.
TRACTION WHEEL.

No. 597,774. Patented Jan. 25, 1898.

Witnesses:
L. C. Hills
W. W. Roberts

Inventor:
Lewis C. Keck
By Glasco Indles
Atty's.

UNITED STATES PATENT OFFICE.

LEWIS C. KECK, OF WASHTA, IOWA.

TRACTION-WHEEL.

SPECIFICATION forming part of Letters Patent No. 597,774, dated January 25, 1898.

Application filed July 22, 1897. Serial No. 645,542. (No model.)

*To all whom it may concern:*

Be it known that I, LEWIS C. KECK, a citizen of the United States, residing at Washta, in the county of Cherokee and State of Iowa, have invented a certain new, useful, and valuable Improvement in Traction-Wheels, of which the following is a full, clear, and exact description.

My invention has relation to traction-wheels; and it consists in the novel construction and arrangement of its parts, as hereinafter described.

The object of my invention is to provide the periphery of a traction-wheel with a number of teeth adapted to slide longitudinally through the rim and adapted to be secured in either their outer or inner position, as the occasion may require.

The further object of the invention is to provide a common mechanism for operating all of the sliding teeth at one time and to provide a suitable means for holding the teeth either in or out, as desired. The inner ends of the teeth are connected by means of pivoted links with the corner of a rectangular collar, said collar surrounding the hub of the wheel. When the teeth are extended, the links connecting the inner ends of the teeth with the said collar are in the same line as the teeth. Thus as the weight is borne on the teeth the strain comes directly against said hub.

The further object of the invention is to provide a U-shaped guide on the inner side of the periphery of the wheel, said guide adapted to strengthen the wheel-rim at the points where the perforations pass through the same.

Figure 2:
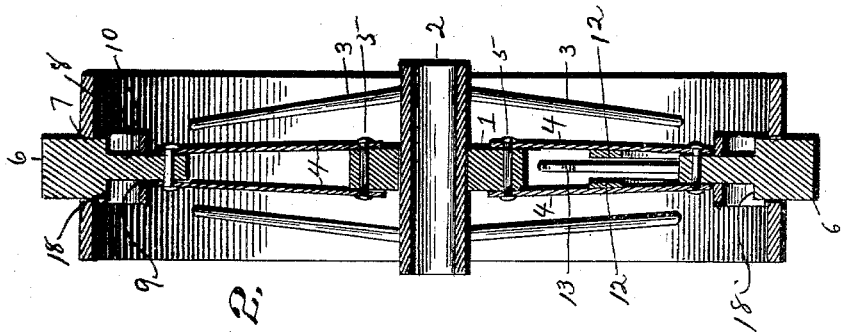
Figure 1:
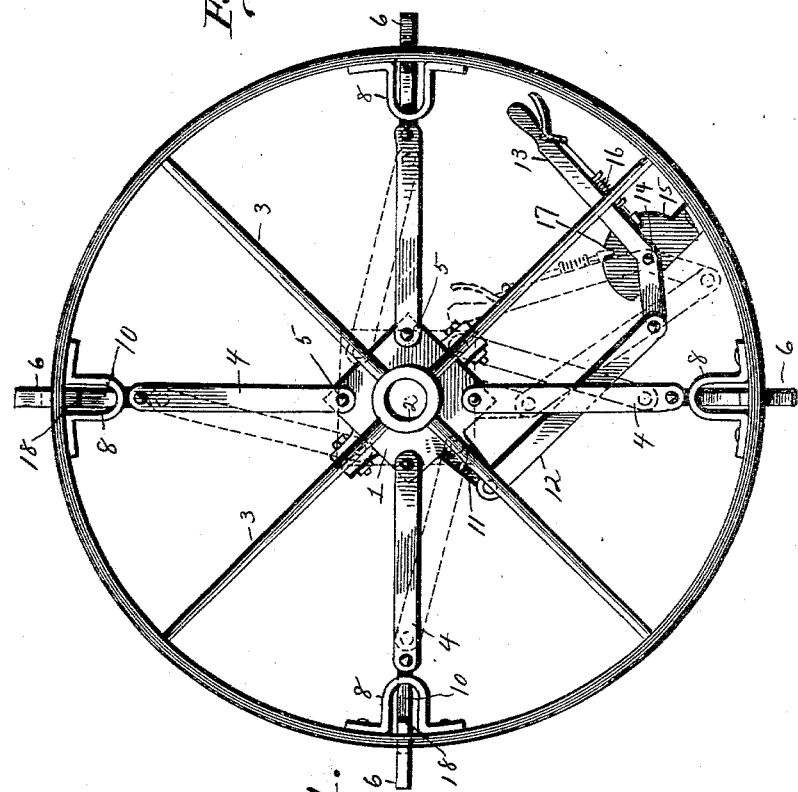

In the accompanying drawings, Figure 1 is a side elevation of the wheel. Fig. 2 is a transverse sectional view of the wheel.

The collar 1 is loosely mounted on the hub 2 of the wheel, said collar being located between the sets of spokes 3 3. The collar 1 may be made in one piece and put on the wheel at the time that it is constructed, or it may be made in several sections and put on any wheel while in use by simply bolting the sections together. The inner ends of the links 4 4 are pivoted at the points 5 to the collar 1. The outer ends of the links are pivoted to the inner ends of the teeth 6. The links are arranged in pairs, as shown in Fig. 2. The teeth 6 pass through the elongated perforations 7 in the rim of the wheel. The U-shaped braces 8 are secured to the inner side of the rim of the wheel, over the perforations 7, each brace 8 having a perforation 9, which is adapted to receive the shank 10 of the teeth 6. The collar 1 is provided with an arm 11, to the outer end of which are pivoted the links 12. The opposite ends of the links are pivoted to the lever 13, said lever 13 being fulcrumed at the point 14 or plate 15, said plate in turn being secured to the inner side of the wheel-rim, as shown in Fig. 1. The links 12 12 pass through links 4 4, as shown in Fig. 1. The lever 13 is provided with a spring-actuated dog 16, said dog being adapted to enter the perforations 17 and retain the lever 13 in any desired position. The heavy lines in Fig. 1 show the position of the lever 13 when the teeth 6 are extended from the outer perforation of the wheel to their farthest extent. The dotted lines in the said figure show the position of the lever 13 when the teeth 6 are drawn in as far as possible. When the teeth 6 are thrown out as far as possible, the links 4 are in alinement with the center of the wheel and the longitudinal axis of the teeth. Thus as the weight is thrust on the teeth longitudinally there is no lateral or twisting strain on the links 4, the thrust being direct. When the teeth 6 are drawn in, the shoulders 18 of the teeth are adapted to come in contact with the inner sides of the U-shaped braces 8. Thus when the teeth are drawn in they are completely housed within the said braces, the braces limiting the inward play of the teeth.

The device is adapted to be used when the traction-engine is running over soft or miry ground—that is, when the engine is going over hard ground the teeth 6 6 may be drawn in. In order to extend or draw in the teeth 6 6, it is simply necessary for the operator to manipulate the lever 13 and the teeth may be placed in any desired position.

A device similar to the one herein described can also be used to advantage on wheels which are adapted to pass over ice or other similar slippery or smooth surfaces. Therefore the invention is not restricted to traction-engines adapted to pass over miry or muddy ground.

Having thus described my invention, what I claim as new, and desire to secure by Letters Patent, is—

1. In combination with a wheel, teeth passing at intervals through the wheel-rim, a revolving collar located on the hub, links pivotally connecting the teeth with the collar, a lever fulcrumed to the wheel-rim, links pivotally connecting said lever with said collar.

2. In combination with a wheel, teeth passing at intervals through the wheel-rim, a revolving collar located on the hub, links pivotally connecting the collar with the teeth, a lever fulcrumed to the wheel-rim, links pivotally connecting said lever with the collar, the lever-links passing between one set of teeth-links.

In testimony whereof I affix my signature in presence of two witnesses.

LEWIS C. KECK.

Witnesses:
 JAMES A. CAMPBELL,
 A. B. BUSHGENS.